UNITED STATES PATENT OFFICE.

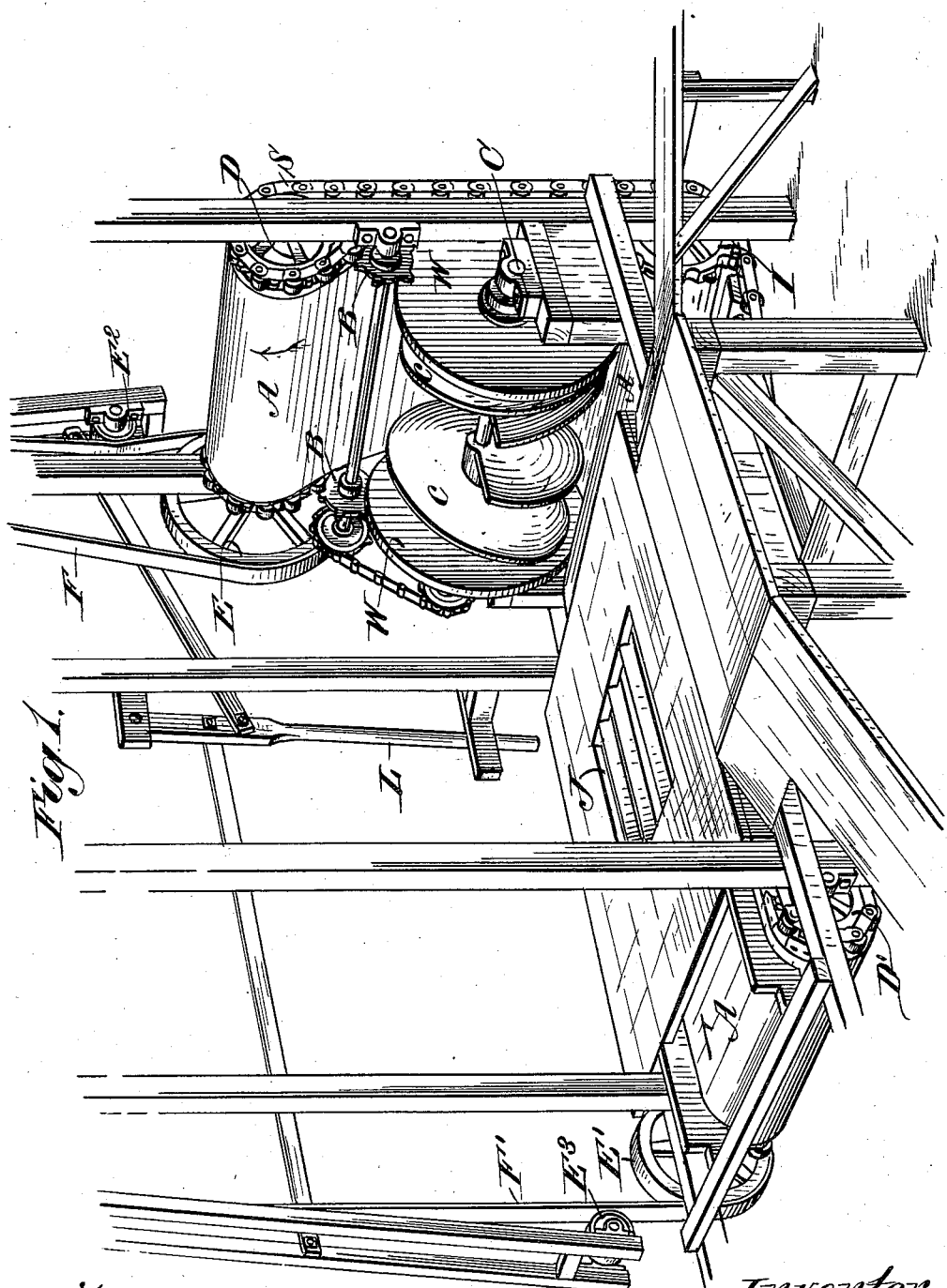

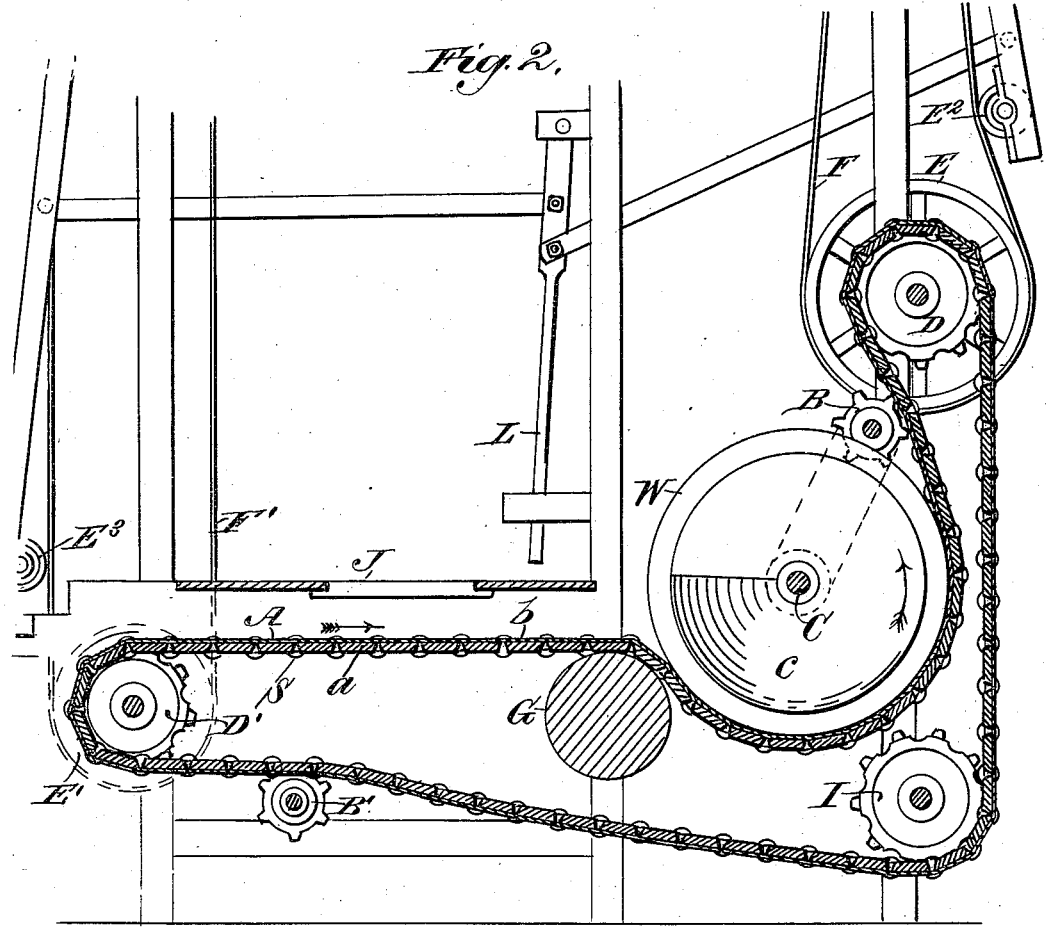
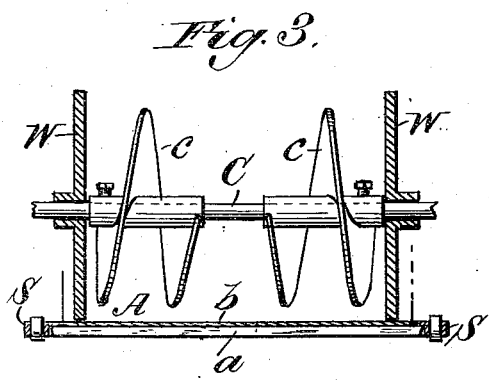
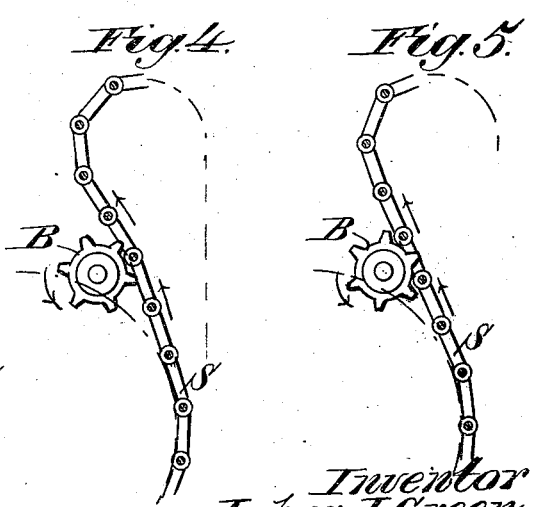

JOSHUA J. GREEN, OF SHREVEPORT, LOUISIANA.

MIXING-MACHINE.

1,019,039.  Specification of Letters Patent.  Patented Mar. 5, 1912.

Application filed June 29, 1911. Serial No. 635,989.

*To all whom it may concern:*

Be it known that I, JOSHUA J. GREEN, of Shreveport, in the parish of Caddo and State of Louisiana, have invented certain new and useful Improvements in Mixing-Machines, of which the following is a specification.

My invention has to do with mixing machines, wherein the materials are mixed or blended in a dry state, as is the case in preparing fertilizer, feed, cement, breakfast food and the like, the materials usually being in finely divided or comminuted condition.

The main characteristic of my machine resides in the devices and combination of devices employed to form the bowl or trough in which the materials are mixed, and in the appliances used in connection therewith.

The bottom and back of the trough are formed by a traveling endless apron and its heads or ends are formed by disks mounted to revolve by contact with the apron so as to move in unison therewith and constituting guides under and partly up around which the apron passes, said disks serving to depress the apron more or less as desired to provide a concave bottom to the bowl, and the apron passing rearwardly up and partly around the guide disks to form a back for the bowl. The material dumped into the bowl will be carried along with the apron, ascending therewith until by gravity it falls back into the bowl, being thus in effect rolled over and over on itself as it continuously drops from the upwardly moving back of the bowl. With the apron is preferably combined a suitable knocking or agitating appliance whereby the portion of the apron which forms the back of the bowl is agitated or jolted in order to shake this portion of the apron clean. These and other features of my invention can however best be explained in connection with the accompanying drawings to which I shall now refer for a better understanding of my improvements.

In said drawings—Figure 1 is a perspective view of a mixing machine embodying my improvements. Fig. 2 is a vertical central section of the same. Fig. 3 is a transverse sectional elevation representing the idler disks or wheels which form the ends of the mixing trough, the reverse spiral conveyers, and the shaft upon which the same are mounted. Figs. 4 and 5 are views illustrative of the action of the "knocker" or "bumper" sprockets B, upon the sprocket chains of the endless apron.

A is the endless apron, consisting of sprocket chains S, between which extend and to which are appropriately attached cross slats $a$ (overlapping if desired). For use with fertilizer, or other acid materials, the apron may have a canvas cover $b$ saturated with paraffin to resist the action of the acid. Other constructions of apron may be used without departure from my invention. The apron passes up over sprocket wheels D, down under sprocket idlers I, forward to and up around the sprocket wheels D', over guide wheels G, under and up the back portion of idler guide disks W, thence back to wheels D, passing on the way thereto over a small portion of the peripheries of idler sprocket wheels B, which deflect the apron slightly to the rear and out of a straight line at a point between where it leaves the guide disks W, and where it meets the sprocket wheels D, these wheels B in connection with the sprocket chains of the apron serving as knockers or bumpers to jolt and shake the apron. A similar contrivance B' for the under ply of the apron is located between the wheels D' and I. All of these sprockets and other wheels and disks are suitably mounted in the frame of the machine. Under this arrangement the endless apron has a horizontal portion, a depressed portion forming the concave bottom of the bowl and an upright or substantially upright portion forming the back wall of the bowl. The front rim of the bowl is defined by the idler guide wheels G over which the chains of the apron pass. The apron is thence deflected downward by the larger idler disks W (preferably of wood) which meet the apron and are revolved by contact therewith. These disks which form the heads or ends of the mixing trough or bowl, are mounted loosely upon a shaft C, upon which are fixed reverse spiral conveyers $c$ of suitable type, which when the shaft revolves in the mixing operation, tend to carry the material in the trough from the ends toward the center. The shaft C is driven in any suitable way—as for example, from one of the bumper sprocket wheels B, by suitable chain gearing as shown.

The materials to be treated are delivered to the machine upon the horizontal portion of the apron in front of the bowl or trough, the apron, at this time, traveling in the direction of the arrow, Fig. 2. They may be thus delivered in any suitable way by elevators, conveyers or other desired means of delivery. In this instance, inasmuch as the machine is supposed to be installed above the floor level, I provide an elevated dumping platform approached by inclined runways for wheel barrow travel, and having a dumping hole J (preferably "cattle-guarded" for safety as shown) through which the material is delivered to the apron.

The shaft on which the sprockets D are mounted has on it a driving wheel E, around which passes a driving belt F, driven from suitable source of power. The shaft on which the sprockets D' are mounted has on it a corresponding wheel E', and driving belt F'. A tightener idler $E^2$ or $E^3$ is provided for each belt, the two being connected by suitable intermediaries to an operating lever L, whereby either tightener idler can be operated to tighten its belt, while the other belt runs loose, as usual in mechanism of this character. When belt F is tightened apron A is driven by the sprockets D in the direction of the arrow, Fig. 2, conveying the material from the dumping point to the mixing point—sprockets D' running as idlers. When on the other hand belt F' is tightened, apron A is driven in a reverse direction by the sprockets D', carrying the mixed material from the mixing point to the dumping point, whence it is discharged and taken care of by suitable conveyers or other appliances—the sprockets D, at this time, running as idlers. In this way the materials to be mixed or blended can be readily conveyed from the dumping to the mixing point, can be there thoroughly and expeditiously mixed, and can then be returned with equal facility to the dumping point or other point of discharge from the machine.

During the mixing operation the material in the mixing trough or bowl is carried up along with the apron until it reaches the perpendicular or a position so nearly approaching the perpendicular that by gravity it will detach itself from the apron and drop back, the charge thus being rolled over and over upon itself insuring speedy and thorough mixture. Some material may still cling to and be carried off with the ascending apron, and to remove this material I employ means for agitating or jolting the portion of the apron where this is liable to occur. Any suitable agitating or shaking means can be employed for the purpose. I prefer to employ for this purpose the bumper sprockets B already referred to. These sprockets are of small diameter and are mounted as idlers to engage the sprocket chains of the endless apron A, and they slightly deflect the apron from a straight line between the points where it leaves the disks W and meets the sprockets D. The links of the chain are preferably quite long, each link having, preferably, say an opening of some six inches in length; and the sprocket B is so proportioned to the chain that the cross bolt or pin or roller, uniting the adjoining ends of any two links, will have left its seat on the sprocket before the next succeeding cross bolt, pin or roller has seated itself on the sprocket, there being thus a brief interval of time in which the chain can drop forward, the side bars of the link straddling momentarily the sprocket wheel B, as in Fig. 4, until the following cross bolt or roller has seated itself on the sprocket, and again pushed back the chain as in Fig. 5. In this way, as the apron moves along, it is, at the point where the sprockets B are located, continuously bumped or jolted, with the result of keeping that portion of the apron in such agitation as to effectively shake off the adhering dust. A similar contrivance is employed at B' on the under side of the lower ply of the endless apron—this contrivance being of use when a reverse drive is imparted to the apron. The smaller the sprockets B relatively to the chains S, the greater the bumping effect, and for this reason I usually prefer to employ sprockets of the least diameter usually made for the particular size of chain employed.

Having described my invention and the best way now known to me of carrying the same into practical effect, I state in conclusion that I do not restrict myself to the structural details hereinbefore shown and set forth in illustration of my invention, for manifestly the same can be varied considerably without departure from the spirit of my invention; but

What I claim herein as new and desire to secure by Letters Patent is as follows:

1. In a mixing or blending machine, a traveling power driven endless apron, guides over and around which the same travels, and idler disks or wheels whereby the top ply of the apron is at a suitable point depressed to form a concave constituting the bottom of a mixing trough, the heads or ends of which are formed by said idler disks or wheels, the apron at the rear of the mixing trough extending upwardly therefrom to form a back wall from which the adhering ingredients carried up along with the traveling apron will by gravity fall back into the trough substantially as and for the purpose hereinbefore set forth.

2. In a mixing or blending machine an endless traveling power driven apron, suitable guides over and around which the same travels, idler disks or wheels, which depress a portion of the upper ply of the apron into a concave constituting the bottom of a mixing trough, the ends of which are formed by said idler disks or wheels, a back wall formed by a portion of the apron extending upwardly from the rear of the trough, and means for agitating or shaking this back wall portion of the apron, substantially as and for the purpose hereinbefore set forth.

3. In a mixing or blending machine, an endless traveling power driven apron and guides over and around which the same travels, idler disks or wheels which depress a portion of the upper ply of the apron into a concave forming the bottom of a mixing trough, the ends of which are formed by said idler disks or wheels, that portion of the apron in advance of the trough, in accordance with the direction of travel of the apron, serving to convey material to, or to carry it away from, the trough, and means whereby the direction of movement of the apron can be reversed at will, substantially as hereinbefore set forth.

4. In combination with the back wall portion of the endless apron extending upwardly from the rear of the concave trough portion of said apron, and the idler disks or wheels which form the ends of the trough, the idler knocker-sprocket wheels engaging the sprocket chains of the back wall portion of the apron, and deflecting the same out of a straight line substantially as and for the purposes hereinbefore set forth.

5. The endless power driven traveling apron, in combination with idler disks or wheels which depress a portion of the upper ply of the apron into a concave constituting a mixing trough, the ends of which are formed by said idler disks or wheels, and power driven means whereby when the machine is in action the materials in the trough are constantly moved from the ends toward the center of the trough, substantially as and for the purposes hereinbefore set forth.

In testimony whereof I affix my signature in presence of two witnesses.

JOSHUA J. GREEN.

Witnesses:
R. P. MOORE,
ED SEAMAN.

---

Copies of this patent may be obtained for five cents each, by addressing the "Commissioner of Patents, Washington, D. C."